March 31, 1964  V. MIKAELSEN  3,126,873

ANIMAL DRINKING DEVICE

Filed Oct. 11, 1962

INVENTOR.

Verner Mikaelsen

BY

Stevens Davis Miller & Mosher

Attorneys

United States Patent Office 3,126,873
Patented Mar. 31, 1964

3,126,873
ANIMAL DRINKING DEVICE
Verner Mikaelsen, Hedensted, Denmark, assignor to Aktieselskabet Brdr. Michaelsen, Hedensted, Metalstoberi & Maskinfabrik, Hedensted, Denmark
Filed Oct. 11, 1962, Ser. No. 229,934
1 Claim. (Cl. 119—75)

The invention relates to a drinking device for animals, such as minks, of the type where water flows into a drinking trough through a valve operated by the animal, said device being provided with a clamping member for attaching the valve to a pipeline with the inlet opening of the valve in communication with a bore in the pipeline.

The object of the invention is to indicate a simple construction of such drinking device in such manner as to permit it of being mounted in a particularly simple and effective manner.

The drinking device according to the invention is characterized in that the clamping member at the same time serves for attaching the device and the pipeline to the wire netting of an animal's cage so that the drinking trough projects into the cage.

Figure 1:
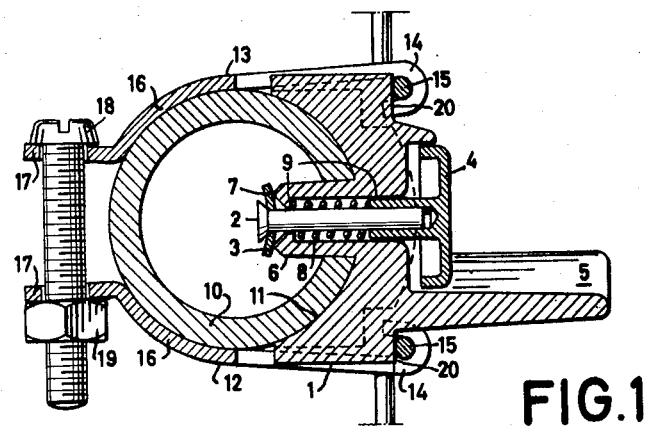
Figure 2:
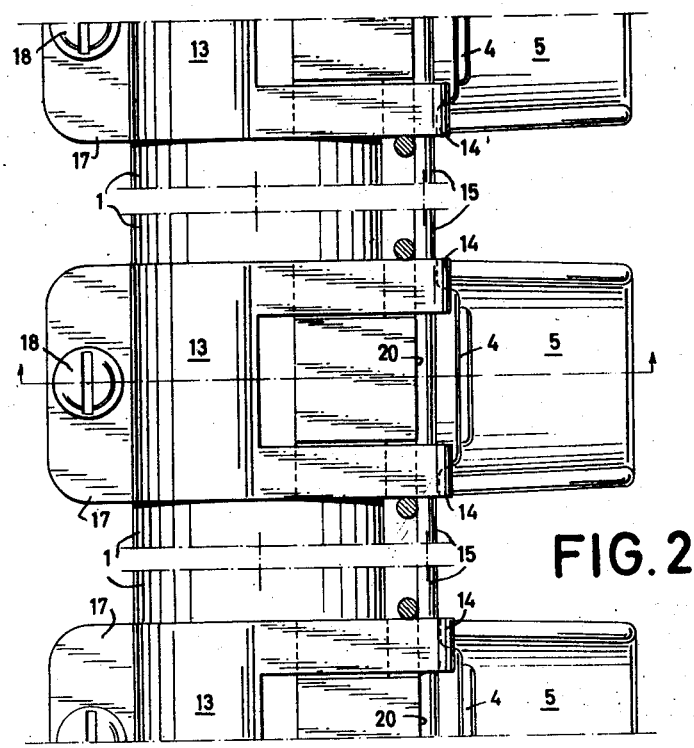

In the following the invention will be explained in detail with reference to the accompanying diagrammatical drawing, where FIG. 1 is a sectional view of an embodiment of the drinking device according to the invention, and FIG. 2 is a top view of a number of such drinking devices mounted to a common pipeline.

In the embodiment of the drinking device according to the invention illustrated in the drawing, the drinking device as such consists of a valve comprising a valve housing 1, a spindle 2, a valve body 3 and an actuation button 4. Moreover, underneath the actuation button 4 there is otherwise in the housing provided a projection 5 in the form of part of a cylinder, said projection serving as a drinking trough.

The valve spindle 2 is displaceably and coaxially arranged in a tubular projection 6, the end of which is formed as a valve seat 7. In the interior of the tubular projection 6, the valve spindle 2 is surrounded by a helical spring 8 forcing the valve body 3 against the valve seat 7 for closing the valve.

In the embodiment shown, the valve spindle 2 is guided in the tubular projection 6 at two places indicated by 9. The inner diameter of the tubular portion must therefore in these two places fit to the valve spindle so as to provide a guiding engagement but at the same time allowing passage of water. This can by way of example be effected by the interior of the tubular portion being at these places cylindrical corresponding to the cross section of the spindle but having one or more recesses in the wall permitting the passage of water, or by the tubular portion being internally of a square cross section with an edge length corresponding to the diameter of the cross section of the spindle.

The valve is mounted on a pipe line 10 which, as will appear from FIG. 2, is common to a number of uniform valves or drinking devices. For this purpose, the housing 1 is in the portion 11 surrounding the tubular projection 6, substantially in the form of a cylinder corresponding to the cylindrical surface of the pipeline 10. The cylindrical portion 6 is extended through a bore in the pipeline so as to permit the portion 11 of the valve housing 1 of engaging the surface of the pipeline 10. When the housing 1 is made of a partially resilient plastic material, and the portion 11 is of a little smaller diameter than the circumference of the pipeline 10, the possibility is afforded by attaching the valve against the pipeline of obtaining a sealing but instead, or at the same time, it is possible to obtain sealing by the bore in the pipeline 10 being made slightly conical, and by making the exterior of the tubular portion 6 correspondingly conical. In cases of the sealing being solely obtained by means of this conicity, it is even advantageous to maintain the substantially cylindrical form of the portion 11 corresponding to the pipeline 10 in order to obtain a stable attachment of the drinking device and the pipeline.

In the embodiment shown, the attachment is effected by means of a clamping member consisting of two alike parts 12 and 13. Each of said parts are at one side provided with two hooks 14 by which they grip around wires 15 in the wire netting of an animal's cage not otherwise shown, which netting in the embodiment shown is in the form of a square netting having vertical and horixontal wires.

Each of the two parts 12 and 13 are moreover provided with a curved part 16 by means of which they can grip around the pipeline 10, as will appear from FIG. 1, and a flap 17 having a hole so that the two parts may be clamped around the pipeline by means of a screw 18 and a nut 19.

In relation to the wire netting, the valve housing is placed in such manner as to engage, by means of two contact surfaces 20, against one each of the two wires 15 about which the hooks 14 grip. These contact surfaces 20 are facing away from the cylindrical portion 11 of the housing, by which it engages the pipeline, and by tightening the nut 19 on the screw 18, the hooks 14 will be pulled so that the wires 15 press the valve housing firmly against the pipeline.

During use, the drinking device functions in the manner that the animal in the cage, for example a mink, scents water, either through the valve or because some moisture has been left in the vicinity of the button 4 of the drinking trough formed by the projection 5. When searching for this water, the animal will with its nose press against the button 4, whereby the valve is opened and some water flows into the drinking trough. The water pressure in the supply line 10 must not be greater than the animal is permitted without any difficulty to open the valve. In the case of minks, a water pressure of 4 metres of water would be appropriate.

The valve according to the invention may be constructed for attachment to the wire netting of other forms than the square netting described above, in that only an adaptation of the contact surfaces 20 and the parts 12 and 13, particularly the hooks 14 thereof, to the form of wire netting used as required in each individual case.

I claim:
An animal drinking device for attachment to a wire cage comprising a supply pipe with an opening therein, a valve housing with a cylindrical member projecting therefrom and extending through said opening, said housing having symmetrical curved surfaces disposed on opposite sides of the cylindrical member in contact with the outer surface of said pipe, the portion of said housing surface disposed opposite said curved surfaces consisting of spaced straight surfaces for bearing against the wires of a wire cage, clamping members consisting of a curved section for bearing against said pipe opposite the curved surfaces of said housing, said clamping members having apertured flaps extending from one end of said curved sections for receiving a bolt member therethrough, the other end of said curved sections extending into a straight section with a reverse hook on its end adapted to hook over the wires in a wire cage to clamp said housing straight surfaces against the wire cage, trough means projecting from said housing for receiving water from said pipe, and valve means disposed in said cylinder for discharging water from said pipe to said trough.

(References on following page)

References Cited in the file of this patent

UNITED STATES PATENTS

| | | |
|---|---|---|
| 1,646,246 | Hazard | Oct. 18, 1927 |
| 2,344,163 | Misch | Mar. 14, 1944 |
| 2,620,770 | Drake | Dec. 9, 1952 |
| 2,653,569 | Forester | Sept. 29, 1953 |
| 2,660,192 | Hunter | Nov. 24, 1953 |
| 2,702,527 | Miele | Feb. 22, 1955 |
| 2,726,636 | Frederiksen | Dec. 13, 1955 |
| 3,038,490 | Yocum | June 12, 1962 |
| 3,049,094 | Smith | Aug. 14, 1962 |